(12) United States Patent
Lutz

(10) Patent No.: US 9,631,411 B2
(45) Date of Patent: Apr. 25, 2017

(54) ACTUATOR FOR MOVABLE FURNITURE PARTS

(71) Applicant: Julius Blum GmbH, Hoechst (AT)

(72) Inventor: Markus Lutz, Hoechst (AT)

(73) Assignee: Julius Blum GmbH, Hoechst (AT)

(*) Notice: Subject to any disclaimer, the term of this patent is extended or adjusted under 35 U.S.C. 154(b) by 0 days.

(21) Appl. No.: 15/040,297

(22) Filed: Feb. 10, 2016

(65) Prior Publication Data
US 2016/0160551 A1 Jun. 9, 2016

Related U.S. Application Data

(63) Continuation of application No. PCT/AT2014/000126, filed on Jun. 16, 2014.

(30) Foreign Application Priority Data

Aug. 30, 2013 (AT) .................................. A 673/2013

(51) Int. Cl.
*A47F 3/14* (2006.01)
*E05F 1/10* (2006.01)
(Continued)

(52) U.S. Cl.
CPC .......... *E05F 1/105* (2013.01); *E05D 11/1064* (2013.01); *E05F 1/1058* (2013.01);
(Continued)

(58) Field of Classification Search
CPC .... E05D 11/1064; E05F 1/105; E05F 1/1261; E05F 1/1058; F03G 1/02; F03G 1/10
See application file for complete search history.

(56) References Cited

U.S. PATENT DOCUMENTS 2,035,823 A * 3/1936 Moore ................ E05D 11/1064
16/200
2,725,052 A * 11/1955 Barnett ................ F24C 15/023
126/191
(Continued)

FOREIGN PATENT DOCUMENTS

DE  1 191 257  9/1965
DE  1 584 088  3/1970
(Continued)

OTHER PUBLICATIONS

Austrian Search Report issued May 20, 2014 in corresponding Austrian Patent Application No. 673/2013 (with English translation).

(Continued)

*Primary Examiner* — Daniel J Troy
*Assistant Examiner* — Andres F Gallego
(74) *Attorney, Agent, or Firm* — Wenderoth, Lind & Ponack, L.L.P.

(57) ABSTRACT

An actuator for moving a movable furniture part includes at least one movably mounted actuating member for moving the movable furniture part, a spring device for applying a force to the actuating member, and a setting device by which a force of the spring device that acts on the actuating member can be set. The setting device has a threaded portion and a screw nut mounted adjustably between two end positions, and the force of the spring device acting on the actuating member can be set by adjusting the screw nut along the threaded portion. At least one supporting element is provided which relieves the screw nut in at least one of the two end positions of the force of the spring device.

15 Claims, 5 Drawing Sheets

(51) Int. Cl.
*E05D 11/10* (2006.01)
*F03G 1/02* (2006.01)
*F03G 1/10* (2006.01)

(52) U.S. Cl.
CPC ................ *F03G 1/02* (2013.01); *F03G 1/10* (2013.01); *E05Y 2201/416* (2013.01); *E05Y 2201/474* (2013.01); *E05Y 2201/492* (2013.01); *E05Y 2201/624* (2013.01); *E05Y 2201/638* (2013.01); *E05Y 2201/70* (2013.01); *E05Y 2800/266* (2013.01); *E05Y 2900/20* (2013.01)

(56) References Cited

U.S. PATENT DOCUMENTS

| | | | | |
|---|---|---|---|---|
| 2,911,667 | A * | 11/1959 | Burke | E05F 1/1261 16/290 |
| 3,187,374 | A * | 6/1965 | Lundell | A45C 13/34 16/289 |
| 3,204,287 | A * | 9/1965 | Gronbach | E05F 1/1261 16/288 |
| 3,256,554 | A * | 6/1966 | Turner | E05F 1/1261 16/273 |
| 3,335,451 | A * | 8/1967 | Patriquin | E05F 3/108 16/52 |
| 3,392,419 | A * | 7/1968 | Stein | E05D 11/1064 16/49 |
| 3,414,933 | A * | 12/1968 | Gronbach | E05D 3/06 16/290 |
| 3,555,591 | A * | 1/1971 | Sogoian | E05F 3/16 16/49 |
| 3,737,947 | A * | 6/1973 | Little | E05F 1/1261 16/290 |
| 3,927,439 | A * | 12/1975 | Gronbach | E05F 1/1261 16/290 |
| 4,000,540 | A * | 1/1977 | Newlon | E05F 1/1253 16/298 |
| 4,894,883 | A * | 1/1990 | Fleischhauer | E05F 1/105 16/66 |
| 6,453,804 | B1 * | 9/2002 | Lee | A23L 3/001 165/206 |
| 6,463,627 | B1 | 10/2002 | Hirtsiefer | |
| 6,637,319 | B1 | 10/2003 | Vanini et al. | |
| 9,261,082 | B2 * | 2/2016 | Mazzullo | F03G 1/02 |
| 9,447,622 | B2 * | 9/2016 | Hellwig | E05F 3/10 |
| 2002/0085868 | A1 * | 7/2002 | Fujimoto | G03G 15/605 399/367 |
| 2004/0239213 | A1 * | 12/2004 | Hirtsiefer | E05D 15/262 312/109 |
| 2007/0107489 | A1 * | 5/2007 | Johnson | G01L 25/00 73/1.12 |
| 2008/0099637 | A1 * | 5/2008 | Pai | F16M 11/30 248/157 |
| 2008/0127452 | A1 * | 6/2008 | Jackson | E05F 1/1253 16/50 |
| 2013/0333291 | A1 | 12/2013 | Blum | |
| 2015/0067986 | A1 * | 3/2015 | Lee | E05F 1/1261 16/321 |
| 2015/0351539 | A1 * | 12/2015 | Baldreich | E05D 11/1064 312/319.2 |
| 2016/0168896 | A1 * | 6/2016 | Holzapfel | E05D 15/401 16/287 |
| 2016/0376823 | A1 * | 12/2016 | Huber | E05F 1/1058 312/319.2 |

FOREIGN PATENT DOCUMENTS

| | | |
|---|---|---|
| DE | 199 18 823 | 7/2000 |
| DE | 100 19 337 | 10/2001 |
| DE | 10 2007 022 269 | 11/2008 |
| EP | 1 148 200 | 10/2001 |
| JP | 63-198795 | 12/1988 |
| JP | 63198795 U * | 12/1988 |
| JP | 2009-62809 | 3/2009 |
| WO | 2012/112997 | 8/2012 |

OTHER PUBLICATIONS

International Search Report issued Oct. 8, 2014 in corresponding International Application No. PCT/AT2014/000126 (with English translation).
English translation of Search Report issued Oct. 8, 2016 in Chinese Application No. 201480047219.5.

* cited by examiner

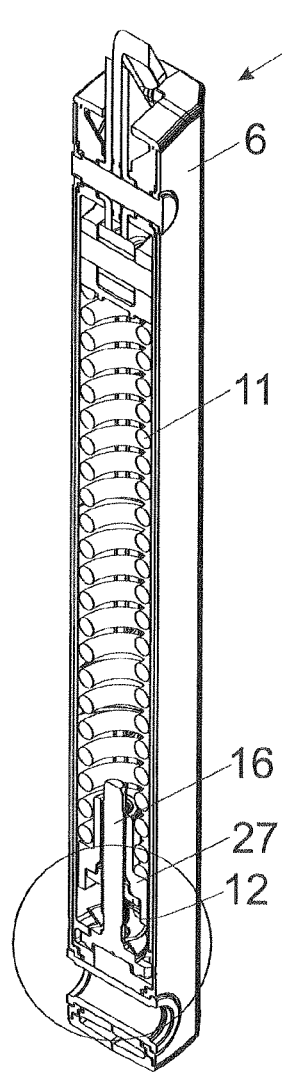
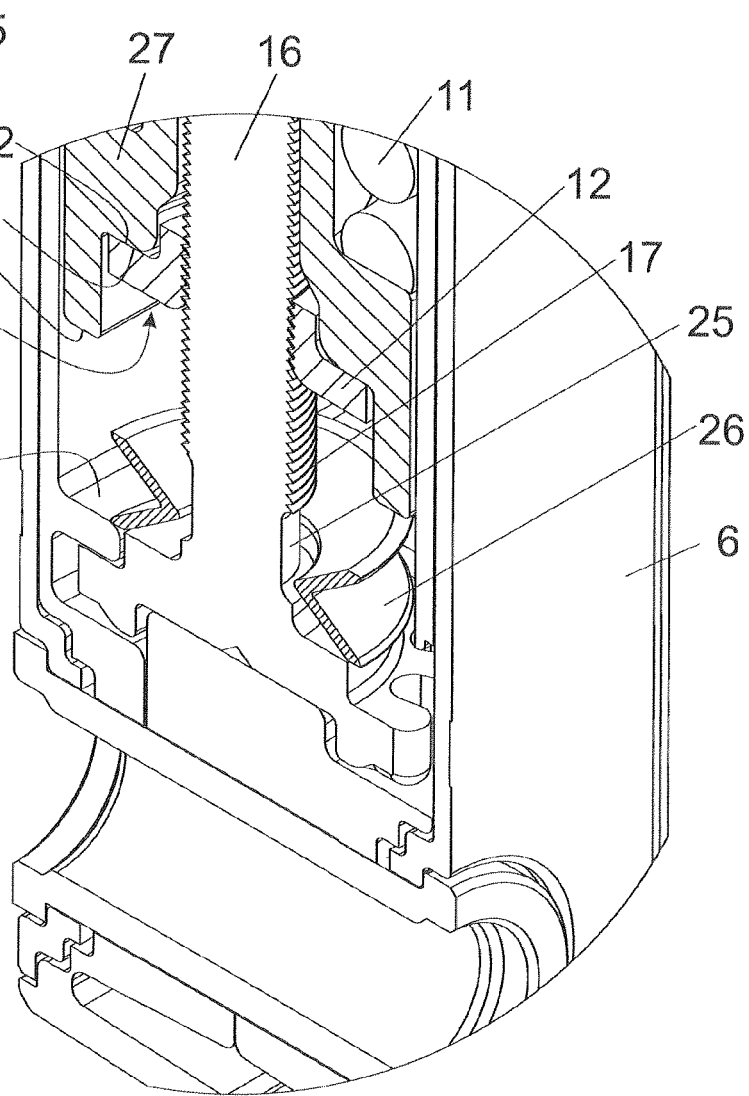
Fig. 3a
Fig. 3b

Fig. 4a
Fig. 4b
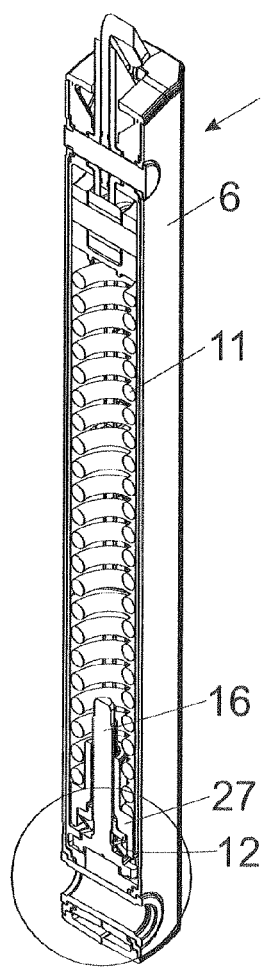
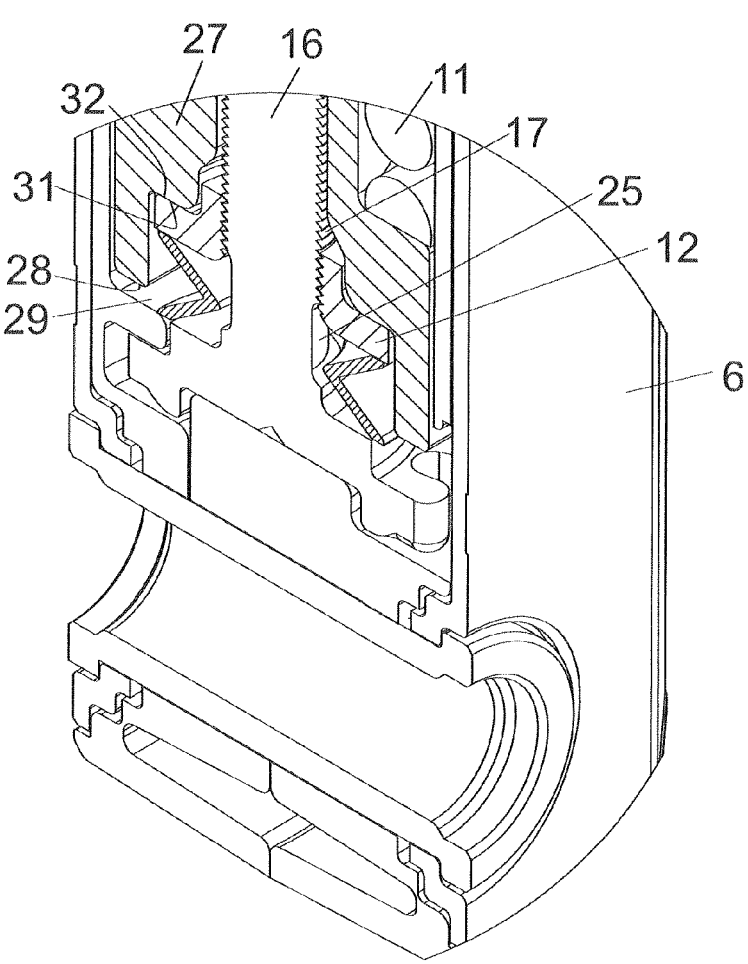

ACTUATOR FOR MOVABLE FURNITURE PARTS

BACKGROUND OF THE INVENTION

The present invention concerns an actuator for moving a moveable furniture part. The actuator includes at least one moveably mounted actuating member for moving the moveable furniture part, a spring device for applying a force to the actuating member, and an adjusting device by which a force of the spring device, that acts on the actuating member, is adjustable. The adjusting device has a threaded portion and a screw nut mounted displaceably between two end positions, and the force of the spring device, that acts on the actuating member, is adjustable by displacement of the screw nut along the threaded portion.

In addition, the invention concerns an arrangement comprising a moveable furniture part which is mounted moveably by way of an actuator of the kind to be described.

DE 1 584 088 B1 and DE 1 191 257 B each disclose hinges with a compression spring for compensating for the weight of chest freezer lids, wherein the force of the compression spring is adjustable by rotation of a guide tube. Mounted to that guide tube is a plate against which the compression spring is supported with an end. The guide tube has a male thread which is in threaded engagement with a rocker arm bearing against a stationary hinge part.

An actuator in the form of a so-called flap support is described, for example, in DE 100 19 337 A1. That flap support includes two arm portions which are hingedly connected together, and a flap-side arm portion is subjected to the force of a compression spring in the opening direction. Provided for adjusting the force exerted on the flap is an adjusting device which includes a displaceable threaded bolt and a threaded nut in threaded engagement with the threaded bolt.

In the case of adjusting devices having a screw nut mounted displaceably along a threaded portion, a problem which frequently occurs is that the screw nut jams when reaching an end position with a counterpart abutment (for example with an underside of a screw head). Once such jamming occurs between the displaceable screw nut and the counterpart abutment, the jamming can only be released by an increased application of manual force. In addition, release of the jamming is made difficult by the force of the acting spring device, because a person has to release the jamming against the force of the spring device by the application of an increased amount of force.

SUMMARY OF THE INVENTION

It is therefore an object of the present invention to provide an actuator of the general kind set forth in the opening part of this specification, wherein the foregoing disadvantages are avoided.

According to the invention, at least one support element is provided which relieves the screw nut of the force of the spring device in at least one of the two end positions.

In other words, in at least one of the two end positions of the screw nut, the force of the spring device is not applied to the screw nut itself, but rather to a housing part of the actuator by way of the support element. Consequently, in at least one end position, the screw nut is not loaded by the force of the spring device so that the screw nut is easy to displace without an axial pressure exerted by the spring device.

To support the support element, it may be desirable if the actuator has a housing, and the support element can be supported against a counterpart abutment fixed with respect to the housing.

BRIEF DESCRIPTION OF THE DRAWINGS

Further details and advantages of the present invention will be apparent from the exemplary embodiment illustrated in the Figures, in which:

FIGS. 3a, 3b show a perspective section and a detail region on an enlarged scale of the actuator, FIGS. 4a, 4b show a perspective view and a detail region on an enlarged scale of the actuator with a displaced screw nut.

DETAILED DESCRIPTION OF THE INVENTION

Figure 1A:
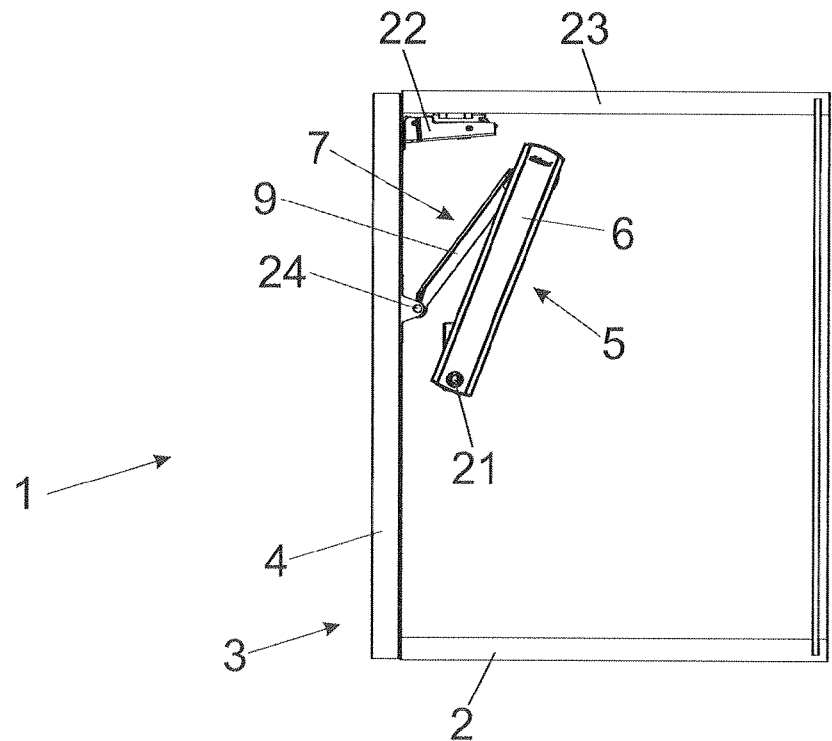
FIGS. 1a, 1b show an article of furniture with an upwardly moveable flap in a closed position and in an open position.
Figure 1B:
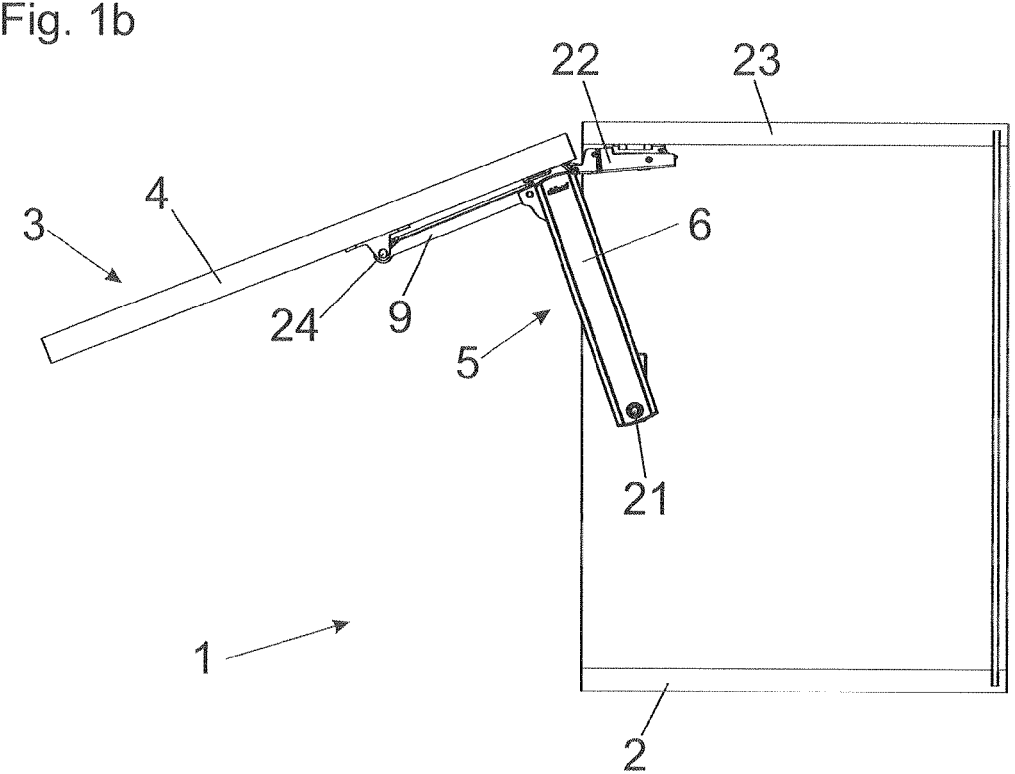
Figure 2A:
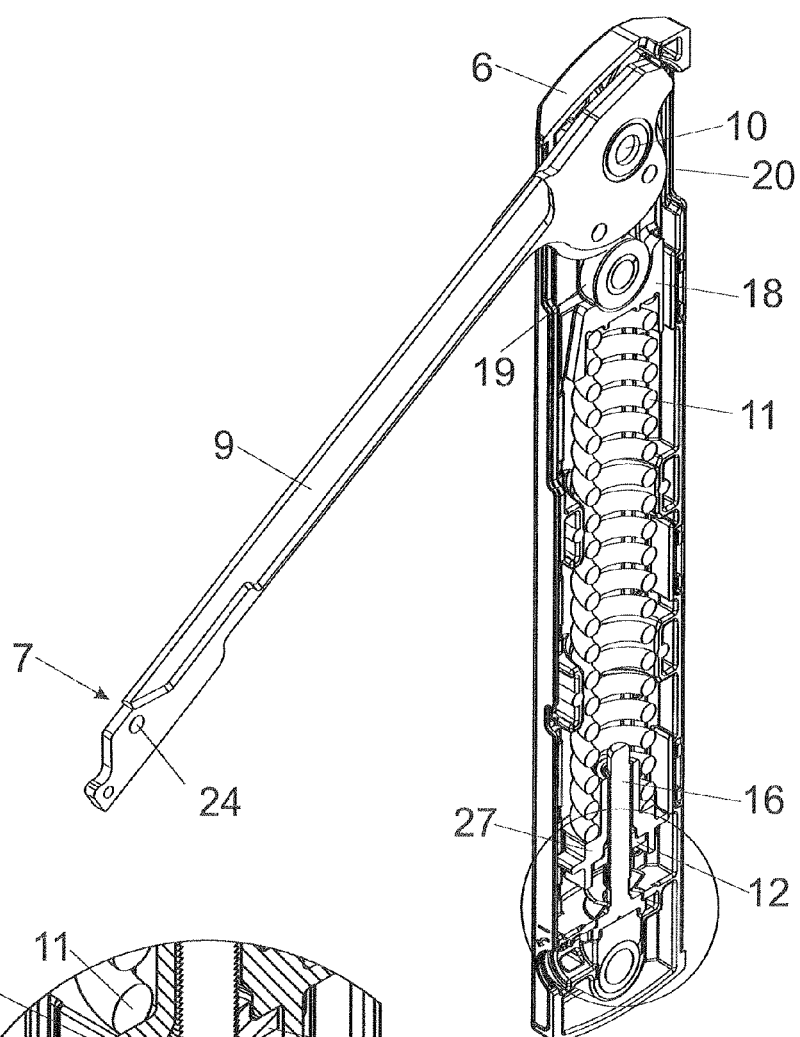
FIGS. 2a, 2b show a perspective cross-section and an enlarged detail view thereof of an embodiment of an actuator.

FIG. 1a shows a perspective view of an article of furniture 1 comprising a furniture carcass 2 and a moveable furniture part 3 in the form of a flap 4 which is mounted pivotably upwardly relative to the furniture carcass 2. FIG. 1b shows the article of furniture 1 with the flap 4 in an open position, wherein the flap 4 is supported pivotably by way of hinges 22 relative to a cabinet top 23 of the furniture carcass 2. Provided for moving the flap 4 is an actuator 5 with a housing 6 which is mounted pivotably relative to the furniture carcass 2 at a bearing axis 21. The actuator 5 further includes a moveably mounted actuating member 7 which, in the illustrated embodiment, is in the form of an actuating arm 9 pivotable in the mounted position about a horizontally extending axis of rotation 10 (FIG. 2a). The flap 4 is mounted moveably by the actuator 5 between a vertical closed position (FIG. 1a) and an upwardly pivoted open position for enabling access to the furniture carcass 2 (FIG. 1b). The pivotably mounted actuating arm 9 is connected to the flap 4 by way of a hinge axis 24.

FIG. 2a shows a perspective cross-section of the actuator 5, wherein the actuating member 7 in the form of the actuating arm 9 is pivotally mounted about an axis of rotation 10 extending horizontally in the mounted position. The free end of the actuating arm 9 is hingedly connected to the flap 4 by way of the hinge axis 24. The actuator 5 includes a housing 6 which is to be fixed to the furniture carcass 2 and in which a spring device 11 is accommodated. In the illustrated embodiment, the spring device 11 includes at least one compression spring in the form of a coil spring. It is, however, also possible to provide two or more coil springs, preferably connected in parallel relationship. A first end region of the spring device 11 is supported against a support element 27, while a second end region of the spring device 11 bears against a slider 18 which is mounted linearly displaceably in the longitudinal direction of the housing 6. The spring device 11 bears indirectly by way of the support element 27 against a screw nut 12 mounted displaceably by an adjusting device 13. Upon displacement of the screw nut 12, the support element 27 is also moved in the longitudinal direction of the housing 6. A pressure roller 19 is mounted rotatably to the slider 18, and the actuating arm 9 is pivotable by way of a control cam 20 along which the pressure roller 19 loaded by the spring device 11 runs. In the illustrated Figure, the control cam 20 is arranged or provided on the actuating arm 9, and the control cam 20 provides a differing radial spacing relative to the axis of rotation 10 of the actuating arm 9. The control cam 20 is designed so that the actuating arm 9 is pushed into the completely closed position at the end of the closing movement. In the opening movement of the actuating arm 9, the pressure roller 19 passes on to an apex point of the control cam 20, whereupon the actuating arm 9 is being urged in the direction of the open position by the force of the spring device 11. For damping the closing and/or opening movement of the actuating arm 9, it is also possible to provide a damper (not shown here), in particular a fluid damper.

Figure 2B:
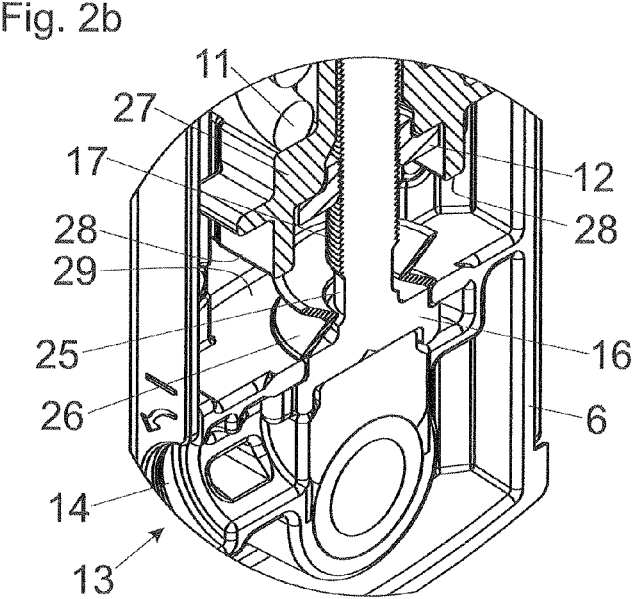

FIG. 2b shows an enlarged view of the region circled in FIG. 2a. The force of the spring device 11, acting on the actuating arm 9, is adjustable by an adjusting device 13. The adjusting device 13 includes an adjusting wheel 14 (preferably adapted for actuation by a tool) which cooperates by way of a transmission mechanism (preferably a bevel gear transmission) with the head of an adjusting screw 16. The adjusting screw 16 is rotatable by way of a rotary movement of the adjusting wheel 14, that is brought about by a tool, in which case the screw nut 12 is moved along the threaded portion 17 of the adjusting screw 16. Alternatively, the adjusting wheel 14 can also be designed for manual actuation. In the illustrated embodiment, the support element 27 is in the form of a—preferably step-shaped—sleeve which at least portion-wise surrounds the threaded portion 17 and which is loosely mounted on the threaded portion 17, that is to say it is not in threaded engagement with the threaded portion 17.

The support element 27 bears on the one hand against the spring device 11 and on the other hand against the displaceable screw nut 12. In the illustrated Figure, the support element 27 has two abutments 28 which, in an end position of facing towards the screw head of the adjusting screw 16, cooperate with (bear against) a counterpart abutment 29 which is fixed with respect to the housing 6 (here with a limb of the housing 6, that extends transversely relative to the longitudinal direction of the housing 6). In that way, the screw nut 12 is completely relieved of the force of the spring device 11 in that end position. It is also possible to see a spring element 26, by way of which the screw nut 12 can be acted upon, at an end region of the adjusting screw 16, with a force directed away from that end region. Upon adjustment of the spring force, jamming of the screw nut 12 with the screw head can be effectively prevented by the spring element 26. To prevent jamming between the screw nut 12 and the head of the adjusting screw 16, it is provided that a thread-less portion 25 adjoins the threaded portion 17. The screw nut 12, in one of the two end positions, can pass into that thread-less portion 25 and can thus be brought out of engagement from the threaded portion 17. The threaded engagement between the screw nut 12 and the threaded portion 17 can be removed in that way so that the adjusting screw 16 rotates idly upon rotation of the adjusting wheel 14. That has the advantage that the screw nut 12 cannot become jammed with the head of the adjusting screw 16, in the minimum adjustment of the spring force. In addition, movement of the screw nut 12 out of the threaded portion 17 makes itself perceptible to a user, with an audible clicking sound. In order for the screw nut 12 to become re-engaged with the threaded portion 17 upon rotation of the displacement wheel 14 in the opposite direction, there is a spring element 26 which is operative between the screw nut 12 and the underside of the head of the adjusting screw 16 and which urges the screw nut 12 upwardly so that the screw nut 12 can again engage in positively locking relationship into the threaded portion 17 of the adjusting screw 16. Upon cooperation of the screw nut 12 with the threaded portion 17, the force of the spring device 11 presses against the screw nut 12. When, in contrast, the screw nut 12 has moved out of the threaded portion 17 and cooperates with the threadless portion 25, then the screw nut 12 is relieved of the force of the spring device 11 by the support element 27 being supported against the counterpart abutment 29 fixed to the housing. By virtue of the fact that no spring force acts on the screw nut 12 in the end position, the force of the spring element 26 can be dimensioned very low. Inexpensive manufacture can be provided if the spring element 26 is in the form of a resilient plastic injection molded part.

FIG. 3a shows a perspective cross-sectional view of the actuator 5, wherein the moveably mounted actuating member 7 for moving the moveable furniture part 3 is not shown. FIG. 3b shows an enlarged view of the region circled in FIG. 3a. The displaceable screw nut 12 is in engagement with the threaded portion 17 of the adjusting screw 16 and the sleeve-shaped support element 27 is only loosely mounted to the threaded portion 17. The spring device 11 presses indirectly by way of the support element 27 onto the displaceable screw nut 12, wherein a first support surface 31 of the screw nut 12 bears against a second support surface 32 of the support element 27. In this case, the force of the spring device 11 is carried by the screw nut 12. The Figure shows the abutment 28 of the support element 27, which in a lower end position of the screw nut 12 cooperates with (bears against) a counterpart abutment 29 which is fixed with respect to the housing 6, and thereby completely relieves the screw nut 12 of the force of the spring device 11 in that end position. The support element 27 is provided with a, preferably step-shaped, opening 30 for receiving the screw nut 12. The support element 27 completely surrounds the screw nut 12, the abutment 28 projecting beyond the screw nut 12 in the direction of the counterpart abutment 29 which is fixed with respect to the housing.

FIG. 4a and the enlarged detail view of FIG. 4b show the actuator 5 with a displaced screw nut 12 so that therefore the force of the spring device 11, acting on the actuating member 7 is reduced in comparison with FIGS. 3a and 2b. The screw nut 12 is still in engagement with the threaded portion 17, and the abutment 28 of the support element 27 is in a spaced position relative to the counterpart abutment 29 which is fixed with respect to the housing. The first support surface 31 of the screw nut 12 and the second support surface 32 of the support element 27 still bear against each other.

Figure 5A:
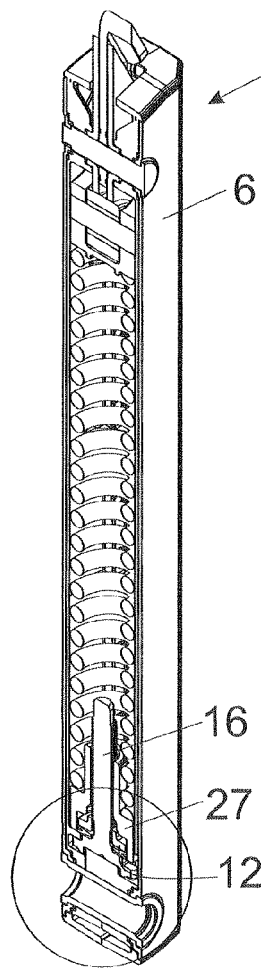
FIGS. 5a, 5b show a perspective cross-section of the actuator with a screw nut in one end position and an enlarged detail view thereof.
Figure 5B:
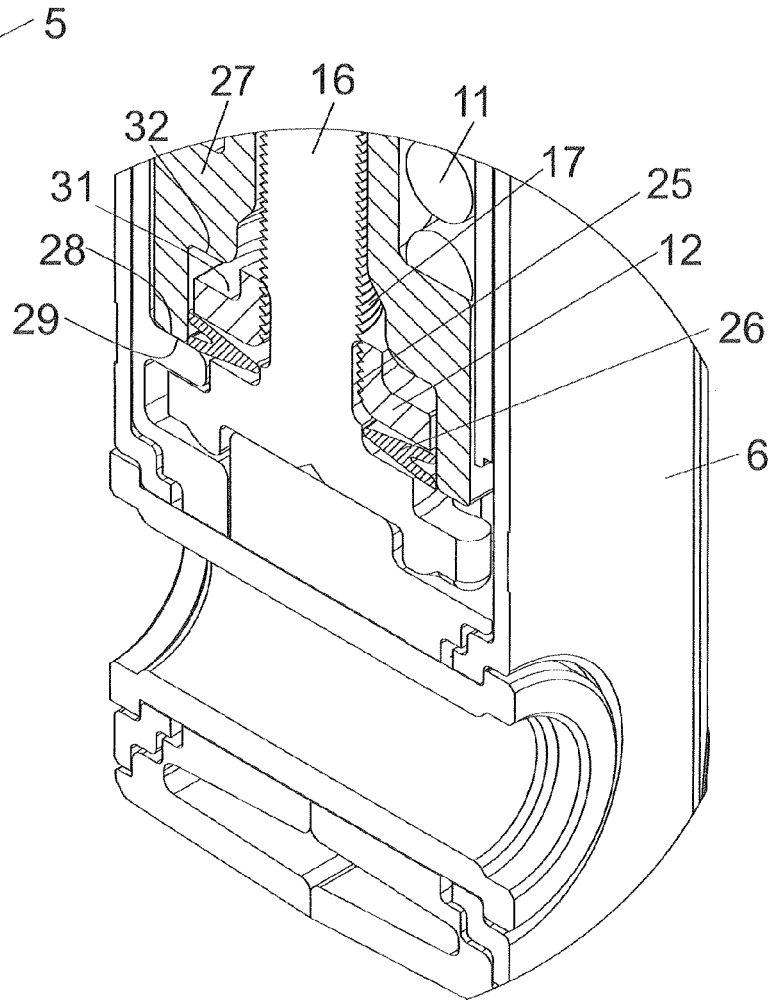

FIG. 5a and the enlarged detail view in FIG. 5b show the actuator 5 with a screw nut 12 in the end position, in which the pre-stressing acting on the actuating member 7 is at its lowest. The screw nut 12 is now located on the thread-less portion 25 of the adjusting screw 16, with the abutment 28 bearing against the counterpart abutment 29 which is fixed with respect to the housing so that the force of the spring device 11 is applied to the housing 6 of the actuator 5 via the support element 27 and the counterpart abutment 29. The first support surface 31 of the screw nut 12 and the second support surface 32 of the support element 27 are now spaced apart. The screw nut 12 is relieved of the force of the spring device 11 by that change in load applied to the housing 6. The spring element 26 urges the screw nut 12 away from the head of the adjusting screw 16, that is to say in the direction of the threaded portion 17. That prevents jamming between the screw nut 12 and the adjusting screw 16. Due to the force of the spring element 26, the screw nut 12 can be centered again upon corresponding actuation of the adjusting device 13 (FIG. 2b) relative to the threaded portion 17.

The invention claimed is:

1. An actuator for moving a moveable furniture part, said actuator comprising:
   a moveably mounted actuating member for moving the moveable furniture part;
   a spring device for applying a force to said actuating member;
   an adjusting device for adjusting the force of said spring device acting on said actuating member, said adjusting device including a threaded portion and a screw nut mounted displaceably between two end positions, wherein the force of said spring device acting on said actuating member is adjustable by displacement of said screw nut along said threaded portion;
   a support element operatively arranged between said spring device and said screw nut such that said spring device indirectly acts on said screw nut via said support element;
   a housing; and
   a counterpart abutment fixed with respect to said housing;
   wherein said support element, said counterpart abutment, said housing, and said spring device are configured such that said support element bears directly against said counterpart abutment at the one of the two end positions such that said spring device is supported by said support element to relieve said screw nut of the force of said spring device.

2. The actuator according to claim 1, wherein said actuating member includes an actuating arm mounted pivotably about an axis of rotation.

3. The actuator according to claim 2, wherein said actuating member further includes a control cam along which a pressure roller loaded by said spring device runs, said control cam being configured to pivot said actuating arm.

4. The actuator according to claim 3, wherein said control cam is on said actuating arm and is configured to provide differing radial spacing relative to the axis of rotation of said actuating arm.

5. The actuator according to claim 1, wherein said support element has an opening for receiving said screw nut.

6. The actuator according to claim 5, wherein said opening is step-shaped.

7. The actuator according to claim 1, wherein said adjusting device has a threadless portion adjoining said threaded portion, said adjusting device being configured such that said screw nut is to pass into said threadless portion and be brought out of engagement with said threaded portion at the one of the two end positions.

8. The actuator according to claim 7, wherein said screw nut and said threaded portion are configured so that the force of the spring device presses onto said screw nut when said screw nut is engaged with said threaded portion, and said screw nut and said threadless portion are configured so that said screw nut is relieved of the force of said spring device by the support of said support element against said counterpart abutment when said screw nut is at said threadless portion.

9. The actuator according to claim 1, wherein said spring device includes a coil spring.

10. The actuator according to claim 9, wherein said coil spring is a compression spring.

11. The actuator according to claim 1, wherein said support element is a sleeve configured to surround at least a part of said threaded portion.

12. The actuator according to claim 1, wherein said support element is mounted loosely to said threaded portion.

13. The actuator according to claim 1, further comprising a spring element for acting upon said screw nut in the one of the two end positions with a force applied in a direction away from the one of the two end positions.

14. The actuator according to claim 1, wherein said adjusting device further includes an adjusting wheel for moving said screw nut along said threaded portion.

15. An arrangement comprising:
   a moveable furniture part; and
   said actuator according to claim 1.

* * * * *